United States Patent Office 3,026,286
Patented Mar. 20, 1962

3,026,286
STABILIZATION OF A COPOLYMERIZABLE MIXTURE OF AN UNSATURATED MONOMER AND AN UNSATURATED POLYESTER WITH DIPHENYL p-BENZOQUINONE, AND STABILIZED MIXTURE OBTAINED THEREBY
Phillip H. Parker, Jr., San Rafael, Calif., assignor to California Research Corporation, San Francisco, Calif., a corporation of Delaware
No Drawing. Filed June 29, 1959, Ser. No. 823,348
6 Claims. (Cl. 260—45.4)

This invention relates to the production of and inhibition of gelation in copolymerizable mixtures of ethylenically unsaturated monomers and ethylenically unsaturated polyesters.

Mixtures of ethylenically unsaturated monomers and ethylenically unsaturated polyesters are very useful in the production of molded articles and surface coatings for laminated products. The mixtures are applied to surfaces and introduced into molds as liquids and then polymerized to hard solids by heat and free radical catalysts. In many instances the mixtures polymerize prematurely to useless solids during storage and while the components are being mixed prior to the inclusion in the mixture of the free radical catalyst. Many polymerization inhibitors have been used in these copolymerizable mixtures to prevent this premature gelation.

The polymerization inhibitors fall generally into two classes having different effects on the viscosity of the polymerizable mixture prior to the point at which the mixture gels. The first class of inhibitors substantially prevents any increase in viscosity of the polymerizable mixture for a period of time prior to gelation. The second class of inhibitors, referred to as "retarders," while preventing gelation for a period of time, permits the viscosity of the polymerizable mixture to increase continuously prior to gelation. Inhibitors of the first class are much more useful than the retarders because the former permit the addition of incremental amounts of inhibitors to a polymerizable mixture in successive stages so that the time before gelation of the mixture occurs can be prolonged substantially; this practice is not possible with the retarders.

Many of these polymerization inhibitors seriously affect the curing characteristics of the mixture of unsaturated monomer and unsaturated polyester when it is subsequently desirable to copolymerize the mixture. Thus, some of the inhibitors slow down the polymerization sufficiently that impractically long polymerization and curing times are necessary, and some inhibitors cause "drift," i.e., fluctuation of required curing time or temperature as the storage time of the mixture is increased. Some of the inhibitors seriously color the polymerization mixture and the final polymer produced after polymerization and curing. Some of the inhibitors, on the other hand, accelerate the rate of polymerization once the polymerization catalyst is added so that the copolymerizable mixture solidifies immediately upon inclusion of catalyst before it can be placed in a mold or applied as a surface coating.

Premature polymerization has been a particularly serious problem when high temperatures must be used in certain processing operations employed in the manufacture of the mixture, as where high temperatures must be used to effect formation of the polyester or to insure fluidity of a high-melting polyester while it is being mixed with the unsaturated monomer. The polymerization inhibitors used heretofore either have been ineffective at these high temperatures or have so interfered with the curing properties of the mixture that they could not be used in effective amounts at the required high temperatures. Since it has been impossible consistently to mix ethylenically unsaturated monomers and these high-melting ethylenically unsaturated polyesters at temperatures sufficiently high that the polyester is liquid, it has been necessary to effect the mixing at low temperatures by comminuting the high-melting polyester to a fine powder and mixing it at low temperature with the unsaturated monomer. This low-temperature mixing procedure, while avoiding premature polymerization, is very impractical and costly since it requires such extensive comminution of the high-melting polyester. Furthermore, it is very desirable to be able to form the mixture of both high-melting and low-melting unsaturated polyesters and unsaturated monomers at relatively high temperatures since the unsaturated polyester is present in a hot state as it is recovered from the polyesterification step of its manufacture, and immediate mixing of the hot polyester with the unsaturated monomer permits reduction in the time cycle necessary for the production of the copolymerizable mixture.

It has now been found that premature polymerization of copolymerizable mixtures of ethylenically unsaturated monomers and ethylenically unsaturated polyesters can be prevented by including in the mixture a new polymerization inhibitor, diphenyl p-benzoquinone. The diphenyl p-benzoquinone inhibitor of the invention is definitive of the various isomers such as 2,3-, 2,5-, 2,6-diphenyl p-benzoquinone, as well as mixtures thereof, and the phenyl groups on the diphenyl p-benzoquinone may carry inert substituents such as hydrocarbon groups of 1 to 18 carbon atoms such as methyl, ethyl, propyl, butyl, phenyl, benzyl, α-naphthyl, or β-naphthyl; halogens such as chlorine, bromine, and iodine; halogen substituted hydrocarbon groups having 1 to 18 carbon atoms; and alkoxy groups such as methoxy, ethoxy, etc.

The new polymerization inhibitor of this invention is more effective at elevated temperatures than any inhibitor used heretofore and substantially prevents polymerization of copolymerizable mixtures of ethylenically unsaturated polyesters at temperatures above about 50° C. and up to about 225° C. The new inhibitor substantially prevents polymerization of the mixture and maintains a relatively constant viscosity of the mixture for an extended period of time prior to gelation. The new inhibitor has very little effect on the final catalyzed cure of the mixture and the properties of the resin produced by cure. The combination of these characteristics makes the new inhibitor more efficient than any inhibitor used heretofore.

The amount of inhibitor which should be incorporated in the mixture will depend on the temperature at which the mixture will be kept and the length of time polymerization inhibition is desired. Preferably the inhibitor is incorporated in an amount of from 0.2 to 20, and preferably from 0.1 to 10 moles of inhibitor per million parts by weight of the mixture of unsaturated monomer and unsaturated polyester.

The inhibitor of this invention is effective in preventing polymerization of a wide variety of mixtures of ethylenically unsaturated monomers and ethylenically unsaturated polyesters. The monomer present in the mixture may be any ethylenically unsaturated compound capable of vinyl polymerization. Preferably, the polymerizable monomer contains a vinyl or vinylidene group. The monomer may be any of the compounds listed in Table I.

TABLE I

(Unsaturated Monomers)

| | |
|---|---|
| Styrene | Diallyl phthalate |
| β-Methyl styrene | Diallyl succinate |
| p-Methyl styrene | Diallyl adipate |
| Divinyl benzene | Diallyl sebacate |
| Indene | Diethylene glycol bis |
| Cyclopentadiene | (Allyl carbonate) |
| Butadiene | Triallyl phosphate |
| Vinyl acetate | Vinyl chloride |
| Methyl methacrylate | Acrylonitrile |
| Methyl acrylate | Triallyl cyanurate |
| Allyl acetate | |

The unsaturated polyester employed in the mixture with the polymerizable monomer may be any polyester containing ethylenically unsaturated units capable of copolymerization with the monomer. Desirably, but not necessarily, the unsaturated polyester is employed in the mixture in an amount of 0.01 to 20 times the weight of the monomer. The unsaturated polyesters may be derived from the condensation of (a) one mole of an aliphatic glycol, such as those listed in Table II, with about one mole of an unsaturated aliphatic dicarboxylic acid, such as those listed in Table III, (b) one mole of an ethylenically unsaturated aliphatic glycol, such as those listed in Table IV, with about one mole of a saturated dicarboxylic acid, such as those listed in Table V, (c) about one mole of an aliphatic glycol, such as those listed in Table II, with from 0.1 to 1 mole of an ethylenically unsaturated dicarboxylic acid, such as those listed in Table III, and from 0.9 to 0 mole of a saturated dicarboxylic acid, such as those listed in Table V, or (d) about one mole of mixed saturated and unsaturated glycols, such as those listed in Tables IV and II, respectively, with one mole of saturated dicarboxylic acids, such as those listed in Table V, or one mole of mixed saturated and unsaturated dicarboxylic acids, such as those listed in Tables V and III, respectively. In addition, small amounts of the glycols and/or dicarboxylic acids can be replaced, respectively, by small amounts of other polyhydric alcohols, such as glycerin, or other polycarboxylic acids, such as pyromellitic acid; and any of the polycarboxylic acids can be employed as the corresponding anhydrides.

TABLE II

(Saturated Glycols)

| | |
|---|---|
| Ethylene glycol | Polyethylene glycol |
| Diethylene glycol | Tetramethylene glycol |
| Triethylene glycol | Pentamethylene glycol |
| 1,3-trimethylene glycol | Hexamethylene glycol |
| 1,2-propylene glycol | Octamethylene glycol |
| Dipropylene glycol | Tetraethylene glycol |
| Butylene glycol | Xylylene diol |
| Styrene glycol | 1,1'-isopropylidene |
| Halogen substituted | bis(p-phenoxy) |
| glycols of the above | di-2 propanol |

TABLE III

(Unsaturated Diacids)

| | |
|---|---|
| Maleic acid | Ethyl maleic acid |
| Fumaric acid | Chloromaleic acid |
| Aconitic acid | Bromomaleic acid |
| Mesaconic acid | Chlorofumaric acid |
| Citraconic acid | Bromofumaric acid |

TABLE IV

(Unsaturated Glycols)

| | |
|---|---|
| Butene diol | 1,6-hexene-2 diol |
| Butyne diol | 1,5-pentene-2 diol |
| 1,6-hexene-3 diol | |

TABLE V

(Saturated Polyacids)

| | |
|---|---|
| Phthalic acid | Oxalic acid |
| Isophthalic acid | Malonic acid |
| Terephthalic acid | Glutaric acid |
| Tetrachlorophthalic acid | Pimelic acid |
| Succinic acid | Biphenyldicarboxylic acid |
| Adipic acid | Naphthalene dicarboxylic acid |
| Suberic acid | Cyclohexane dicarboxylic acid |
| Azelaic acid | Pyrotartaric acid |
| Dimethyl succinic acid | Sebacic acid |

As stated above, the inhibitor of this invention is particularly useful for the production of mixtures of polymerizable ethylenically unsaturated monomers and high-melting ethylenically unsaturated polyesters. The high-melting unsaturated polyesters with which the inhibitor of the invention is particularly useful are those having softening points above about 40° C. and preferably those having softening points within the range of 40° C. to 100° C. Outstanding examples of such high-melting polyesters are the polyesters derived by the reaction of about one mole of a glycol selected from Table II with a mixture of isophthalic acid and one of the unsaturated dicarboxylic acids listed in Table III. Particularly outstanding examples of such polyesters are those in which the mole ratio of isophthalic acid to the unsaturated dicarboxylic acid is between 4:1 and 1:4. The inhibitors of this invention are also very useful in preparing mixtures of unsaturated monomers with many other high-melting unsaturated polyesters, such as one available to the trade under the trade name of "Atlac 382" sold by Atlas Powder Company, which comprises the polyesterification product of maleic acid and a glycol derived from the condensation of bis phenol A and a lower aliphatic glycol.

The ability of diphenyl p-benzoquinone to prevent premature gelation of a mixture of an ethylenically unsaturated monomer and an ethylenically unsaturated polyester is illustrated by the following examples.

EXAMPLE I

A high-melting unsaturated polyester derived from propylene glycol, maleic anhydride and isophthalic acid, and having an isophthalic acid to maleic anhydride mole ratio of 3:1, was prepared as follows.

Isophthalic acid, 759 grams, 4.56 moles, and propylene glycol, 485 grams, 6.38 moles, were charged to a two-liter flask and heated to between 180 and 240° C. under a nitrogen atmosphere for about 16 hours. After this heating period, the acid number of the mixture was 1.2. Propylene glycol distilled overhead during this heating was collected and, after the heating period, added to the mixture together with 149 grams, 1.52 moles of maleic anhydride; and the mixture was then heated to between 160 and 215° C. for an additional 13 hours at which time the acid number of the mixture was 17. This polyester had a softening point of 95° C. and was just sufficiently fluid to pump at 160° C.

EXAMPLE II

A copolymerizable mixture of this unsaturated polyester and styrene was prepared by the following cold-mixing technique.

The polyester prepared in Example I was cooled to 25° C., shattered, and ground to a fine powder. One hundred and five parts by weight of the powder were poured into 70 parts by weight of styrene at 25° C. over a period of two hours while the mixture was agitated. Thereafter, the mixture was agitated for an additional hour. The mixture thus produced was a clear fluid solution at 25° C. A portion of this solution was placed in a test tube in an oil bath at 114° C.; the mixture gelled in about one-half hour. The gel time was taken as the earliest time when a 1-millimeter glass bead would no longer sink to the bottom of the test tube. A second portion of this solution was mixed with 1.7 gram moles of diphenyl p-benzoquinone per million grams of the solution, and the mixture was placed in a test tube in an oil bath at 114° C.; the mixture did not gel until after about 7 hours.

EXAMPLE III

A copolymerizable mixture of the unsaturated polyester of Example I and styrene was prepared by the following hot-mixing technique.

Styrene, 700 grams, and 0.3 gram, 0.00115 mole, of 2,5-diphenyl p-benzoquinone were added to a three-liter flask equipped with an agitator and external heating and cooling coils. The mixture was heated to 83° C. and 1,050 grams of the polyester prepared in Example I were pumped into the mixture. The polyester was at a temperature of 160° C. The addition was carried out over a period of 9 minutes during which time the temperature of the mixture rose to 110° C. During the next 20 minutes the mixture was cooled to 54° C. by circulation of cooling water around the flask.

The copolymerizable mixture thus produced was a clear, viscous liquid at 25° C. and had substantially the same curing characteristics as the copolymerizable mixture prepared by the cold dilution technique in Example II. The copolymerizable mixture produced in Example II had substantially the same physical properties as the mixture produced in Example III with the exception that the latter had a faint yellow color due to the presence of the inhibitor. Both mixtures were cured under similar conditions to clear solids which had substantially identical physical properties; the color of the mixture of Example III faded during curing.

EXAMPLE IV

A high-melting unsaturated polyester derived from propylene glycol, maleic anhydride, and isophthalic acid, and having an isophthalic acid to maleic anhydride mole ratio of 2:1, was prepared and hot diluted with styrene as follows.

Isophthalic acid, 688 grams, 4.15 moles, and propylene glycol, 494 grams, 6.5 moles, were charged to a two-liter flask under a nitrogen atmosphere and heated to between 175 and 230° C. for 19 hours. After this heating period, the acid number of the mixture was 0.9. During the heating period, 170 ml. of propylene glycol and water were distilled overhead. After this heating period, 20 ml. of propylene glycol and 203 grams, 2.07 moles, of maleic anhydride were added to the mixture; and the mixture was heated to between 175 and 215° C. for 13 hours, at which time the acid number of the mixture was 14.3. The polyester thus produced was immediately pumped into a mixture of about 800 grams of styrene containing 0.5 gram, 0.00192 mole, of 2,5-diphenyl p-benzoquinone. The styrene-diphenyl benzoquinone mixture was at an initial temperature of 65° C., and the polyester was at an initial temperature of 215° C. The addition of the polyester to styrene was carried out over a period of 5 minutes during which time the temperature of the mixture rose to 121° C.; the styrene-polyester mixture was then maintained at a temperature of 93° C. for an additional 30 minutes to simulate the mixing conditions which would prevail in a larger batch operation. The styrene-polyester mixture was then cooled to room temperature and was a clear viscous liquid. The cure characteristics of the mixture thus produced were substantially the same as similar mixtures produced by the cold-dilution technique of Example II.

EXAMPLE V

A low-melting unsaturated polyester derived from propylene glycol, maleic anhydride, and phthalic anhydride, and having a phthalic anhydride to maleic anhydride mole ratio of 1:1, was prepared and hot diluted with styrene as follows.

Propylene glycol, 478 grams, 6.3 moles, phthalic anhydride, 444 grams, 3 moles, and maleic anhydride, 294 grams, 3 moles, were charged to a two-liter flask fitted with a stirrer, nitrogen inlet, thermo well, and steam-jacketed condenser. The mixture was heated to a temperature within the range of 171 to 210° C. for 9 hours. The polyester thus produced had a softening point of 30° C. The finished polyester, at a temperature of 200° C., was pumped into a mixture of 477 grams of styrene and .236 grams, 0.000908 mole, of 2,5-diphenyl p-benzoquinone at a temperature of 43° C. This addition was carried out over a period of 5 minutes, and the temperature of the mixture thus produced rose to 115° C. The mixture was then maintained at a temperature of 93° C. for an additional 40 minutes to simulate a larger batch operation. The sample was then cooled to room temperature. The copolymerizable mixture thus produced was a clear viscous liquid having substantially the same cure characteristics as similar mixtures prepared at lower temperatures in the absence of diphenyl quinone.

EXAMPLE VI

A copolymerizable mixture of styrene and another high-melting polyester, Atlac 382, was prepared in the following manner.

The Atlac polyester, 950 grams, was placed in a two-liter, three-neck flask fitted with nitrogen inlet, stirrer, and condenser. 25 ml. of mixed hexanes were added to expel air from the polyester, and the polyester was heated to a temperature of 177° C. Styrene, 633 grams, and 2,5-diphenyl p-benzoquinone, 0.16 gram, 0.000615 mole, were placed in a container and heated to a temperature of 76° C. and the hot polyester was added thereto over a period of 4 minutes; the temperature of the mixture rose to 116° C. The mixture was cooled to room temperature over a period of one hour and at room temperature was a viscous liquid. Comparative cures of the mixture produced in this example and a similar mixture produced by the cold-dilution technique of Example II showed that the presence of diphenyl quinone had substantially no effect on the curing of the copolymerizable mixture.

The new inhibitor, diphenyl p-benzoquinone, can be prepared in accordance with the procedure described in Schildknecht and Adams, J. Am. Chem. Soc., 53, 2375 (1931).

I claim:

1. The method of inhibiting gelation at temperatures between 50 and 225° C. of a mixture of a polymerizable unsaturated monomer containing the group $CH_2=C<$ and from 0.1 to 20 parts by weight based on the weight of said monomer of an ethylenically unsaturated alkyd resin copolymerizable with said monomer which comprises incorporating in said mixture a minor amount of a diphenyl p-benzoquinone.

2. The method of claim 1 in which said diphenyl p-benzoquinone is incorporated in said mixture in an amount of from 0.2 to 20 moles per million parts by weight of said mixture.

3. The method of inhibiting gelation at temperatures between 50 and 225° C. of a mixture of a polymerizable monomer containing the $CH_2=C<$ group and from 0.1 to 20 parts by weight based on the weight of said monomer of a polyester comprising the reaction product of about one mole of an aliphatic glycol with from 0.1 to one mole of an unsaturated aliphatic dicarboxylic acid and an effective amount up to 0.9 mole of an acid reacting material selected from the group consisting of aliphatic saturated dicarboxylic acids, phthalic acids and their anhydrides, which comprises incorporating in said mixture a diphenyl p-benzoquinone in an amount of from 0.2 to 20 moles per million parts by weight of said mixture.

4. The method of preparing a copolymerizable mixture of a polymerizable unsaturated monomer containing the group $CH_2=C<$ and from 0.1 to 20 parts by weight based on the weight of said monomer of an ethylenically unsaturated alkyd resin copolymerizable with said monomer which comprises mixing said monomer and said polyester in liquid phase at a temperature between 50 and 225° C. in the presence of a minor amount of a diphenyl p-benzoquinone.

5. The method of preparing a copolymerizable mixture of a polymerizable monomer containing the group $CH_2=C<$ and from 0.1 to 20 parts by weight based on the weight of said monomer of a polyester comprising the reaction product of about one mole of an aliphatic glycol with from 0.1 to one mole of an unsaturated aliphatic dicarboxylic acid and an effective amount up to 0.9 mole of isophthalic acid which comprises adding said polyester at a temperature between 100 and 225° C. to a body of said monomer at a temperature of from 50 to 80° C. containing 0.2 to 20 moles of a diphenyl p-benzoquinone per million parts by weight of said monomer and said polyester.

6. A composition inhibited against gelation at temperatures between 50 and 225° C. but capable of rapid gelation upon the addition of a polymerization catalyst which comprises (a) a polymerizable monomer containing the $CH_2=C<$ group, (b) from 0.1 to 20 parts by weight based on the weight of said monomer of a polyester comprising the reaction product of about one mole of an aliphatic glycol with from 0.1 to one mole of an unsaturated aliphatic dicarboxylic acid and an effective amount up to 0.9 mole of an acid reacting material selected from the group consisting of aliphatic saturated dicarboxylic acids, phthalic acids and their anhydrides, and (c) from 0.2 to 20 moles of a diphenyl p-benzoquinone per million parts by weight of said monomer and said polyester.

References Cited in the file of this patent

UNITED STATES PATENTS

| | | |
|---|---|---|
| 2,610,168 | Anderson | Sept. 9, 1952 |
| 2,632,753 | Anderson | Mar. 24, 1953 |